United States Patent [19]

Sandberg

[11] Patent Number: 4,821,376
[45] Date of Patent: Apr. 18, 1989

[54] SEAL-OFF FOR FOOD PATTY MOLDING MACHINE WITH MULTI-ORIFICE FILL PASSAGE AND STRIPPER PLATE

[75] Inventor: Glenn A. Sandberg, Lockport, Ill.
[73] Assignee: Formax, Inc., Mokena, Ill.
[21] Appl. No.: 202,129
[22] Filed: Jun. 2, 1988
[51] Int. Cl.$^4$ ................................................ A22C 7/00
[52] U.S. Cl. .......................................... 17/32; 425/199
[58] Field of Search ................... 17/32; 425/197, 198, 425/199

[56] References Cited

U.S. PATENT DOCUMENTS 4,372,008  2/1983  Sandberg .............................. 17/32
4,541,143  9/1985  Holly ................................. 17/32 X Primary Examiner—Willie G. Abercrombie
Attorney, Agent, or Firm—Kinzer, Plyer, Dorn, McEachran & Jambor

[57] ABSTRACT

A mold station of a food patty molding machine in which a food pump pumps a moldable food product through a fill passage into mold cavities in a cyclically reciprocating mold plate, with a multi-orifice plate interposed in the fill passage and a stripper plate, slidably mounted immediately adjacent the orifice plate, having a multiplicity of fill openings aligned one-for-one with the fill orifices; a stripper plate drive, synchronized with the mold plate drive, slides the stripper plate a short distance to a seal-off location once in each mold plate cycle. The spacings between fill openings in the stripper plate are made large enough to close all of the fill orifices when the stripper plate is moved to its seal-off location; the stripper plate drive shifts the stripper plate to its seal-off location before movement of the mold plate toward its discharge position can create an open outlet path from the food pump through the mold cavities to outside of the mold station.

4 Claims, 3 Drawing Sheets (FILL)

(SEAL-OFF)

SEAL-OFF FOR FOOD PATTY MOLDING MACHINE WITH MULTI-ORIFICE FILL PASSAGE AND STRIPPER PLATE

BACKGROUND OF THE INVENTION

Food patties of various kinds, including hamburgers, molded "steaks", fish cakes, chicken patties, pork patties, potato patties, and others, are frequently formed in high-volume automated molding machines. Patty molding machines that can be successfully adapted to any of these food products are described in U.S. Pat. Nos. 3,887,964 to L. R. Richards, 4,054,967 to G. A. Sandberg et al, and 4,182,003 to LaMartino et al. A smaller machine is described in Sandberg U.S. patent application Ser. No. 106,249, filed Oct. 7, 1987. In all of these machines, using relatively small fill passages, the fill passage is always effectively sealed off from the space outside of the molding station.

Although any of these machines, and others, can produce food patties of consistent size, weight, and configuration, substantial problems and difficulties may remain. Thus, in many patty molding machines it may be difficult to duplicate the texture of hand-molded hamburgers and other such patties. Machine-molded food patties may tend toward excess shrinkage when cooked. Distortion in the patty shape may also occur when the patties are cooked.

Machines for molding food patties that have essentially uniform texture and minimal shrinkage when cooked are disclosed in Sandberg et al U.S. Pat. No. 4,356,595; the patties also hold their shape consistently following cooking. In those patty molding machines a multi-orifice plate is interposed in the outlet end of a fill passage extending from a food pump to a cyclically reciprocating mold plate. The food pump is preferably controlled so that the maximum fill pressure, desirable for consistent filling of the mold cavities, is used for only a limited part of each mold plate cycle.

Those machines, while highly satisfactory for many food products (e.g., ground pork, ground chicken, finely ground beef, etc.) are not entirely successful for some other foods, particularly foods that incorporate long and sometimes tough fibers. One such food product is coarsely ground beef. A food product of this nature tends to create an excessive buildup of fibrous material at the entrances of the orifices, requiring an excessive pumping pressure to operate the patty molding machine at high speeds. That buildup problem is effectively solved in the molding machines described in Sandberg U.S. Pat. No. 4,372,008, using a stripper plate slidably mounted immediately adjacent the fill plate; the stripper plate has fill openings that align one-for-one with the fill plate orifices when the stripper plate is in a fill location. Once the mold cavities are filled, the stripper plate slides transversely of the direction of mold plate movement to cut food fibers on the upstream side of the fill plate.

Molding machines using wide-area fill passages with multi-orifice fill plates have had one distinct disadvantage; there has been no convenient and effective way to maintain a seal-off of the mold cavity and feed passage throughout the mold plate cycle. Thus, as the mold plate moves out toward its discharge (knockout) position, there is a portion of the cycle time when continuous paths are open from the feed passage, through some of the stripper plate fill openings and feed plate fill orifices, and through the mold cavity, to the space outside of the molding station. Even if these paths are quite small, the results are highly undesirable; waste of the food product, distortion of the patties, violation of sanitary requirements, and reduced pumping efficiency can all occur.

Previous efforts to resolve this lack of an effective seal-off, in large area multi-orifice fill passage machines, have included controls to shut off the food pump completely during the times in each mold cycle when continuous paths to the space around the mold station are present. This expedient is difficult to implement and not particularly effective. Another technique that could be used for effective seal-off would be to extend the housing of the molding station (e.g., the mold plate support and its cover) far enough in the direction of mold plate movement toward its discharge station to achieve full seal-off. But this is quite uneconomical; it requires a major machine re-design and inherently increases the mold plate cycle time and machine size and cost.

SUMMARY OF THE INVENTION

It is a principal object of the present invention, therefore, to provide a new and improved cyclic food patty molding machine of the reciprocating mold plate type that effectively eliminates or minimizes the problems and difficulties described above and that permits the molding of food products through a large area, multi-orifice fill passage while maintaining effective seal-off of the fill passage throughout the mold plate cycle.

Accordingly, the invention relates to improvements in a food patty molding machine comprising a mold plate having at least one mold cavity therein, mold plate drive means for driving the mold plate along a given path, in a repetitive cycle, between a fill position and a discharge position, food pump means for pumping a moldable food product, and a fill passage connecting the food pump to the mold cavity when the mold plate is in its fill position. A fill plate, interposed in the fill passage immediately adjacent the mold plate, has a multiplicity of fill orifices distributed in a predetermined pattern throughout an area aligned with the mold cavity when the mold plate is in its fill position; a stripper plate interposed in the fill passage immediately adjacent the side of the orifice plate opposite the mold plate, and movable along a path transverse to the mold plate path between a fill location and a discharge location, has a multiplicity of fill openings aligned one-for-one with the fill orifices as extensions thereof when the stripper plate is in its fill location. Stripper plate drive means, synchronized with the mold plate drive means, moves the stripper plate between its fill location and its discharge location. In the improvement of the present invention, the spacings between fill openings in the stripper plate, in the direction of the stripper plate path, are such that movement of the stripper plate to its discharge location seals off the fill openings; the stripper plate drive means moves the stripper plate to its discharge location, in each mold cycle, before the mold cavity moves appreciably away from its fill position toward its discharge position, and then the stripper plate drive means maintains the stripper plate in its discharge location while the mold plate moves toward its discharge position, at least until the mold cavity is displaced beyond the fill orifices.

DESCRIPTION OF THE PREFERRED EMBODIMENT

Figure 1:
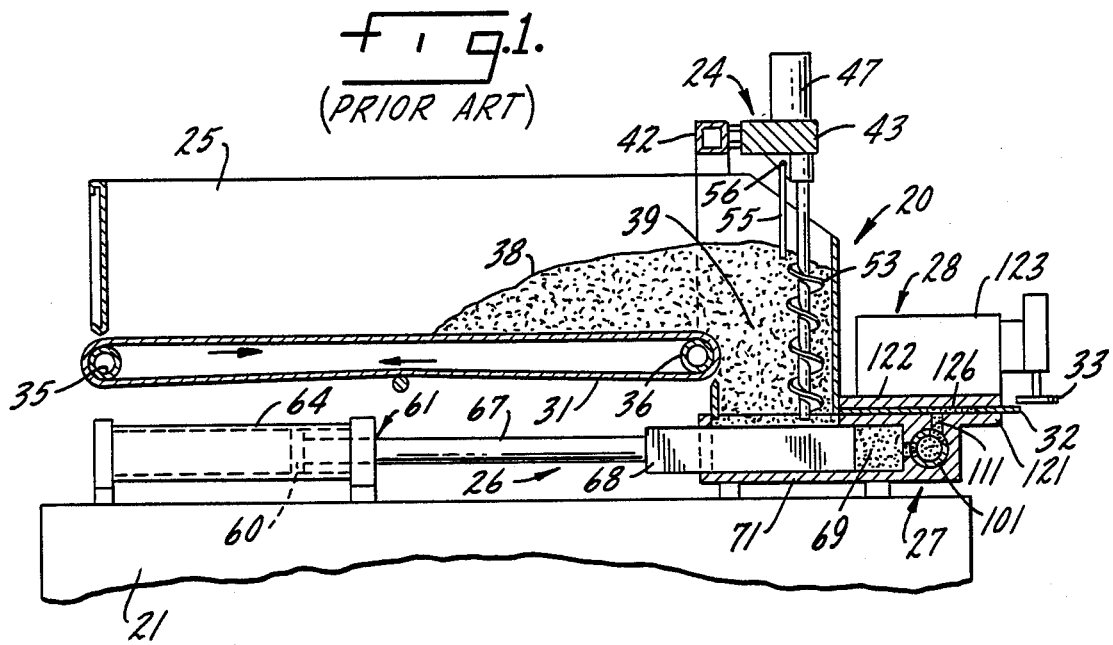
FIG. 1 is a sectional elevation view of the molding mechanism of a food patty molding machine of one type to which the present invention can be applied, specifically the molding machine of Richards U.S. Pat. No. 3,887,964.

FIG. 1 illustrates a high volume food patty molding machine 20 of the type described in detail in Richards U.S. Pat. No. 3,887,964, which machine has been marketed for several years as the FORMAX 26 machine by Formax, Inc. of Mokena, Ill. Molding machine 20 includes a machine base 21 which supports the operating mechanisms of the machine and contains hydraulic actuating systems, electrical actuating systems, and most of the machine controls.

The food patty molding machine 20 includes a supply means 24 for storing and supplying a moldable food product, such as ground beef, fish, pork, chicken, potatoes, or the like, to the processing mechanisms of the machine. Supply means 24 includes a large food product storage hopper 25 that supplies a food pump system 26. System 26 includes two food pumps (one shown) operating in alternation; other machines typically include only a single food pump. The two food pumps continuously pump food, under pressure, into a valve manifold connected to a cyclically operable molding station 28. Molding station 28 includes a multi-cavity mold plate 32 that moves cyclically between a fill position, shown in FIG. 1 and a discharge position in which its mold cavities are outside of station 28, aligned with a set of knock-out cups 33.

Food supply means 24 includes a conveyor belt 31 that extends completely across the bottom of hopper 25, around a tensioning roller 35 and a drive roller 36. In FIG. 1, a limited supply of food product 38 is shown in hopper 25; a much greater supply could be stored in the hopper without exceeding its capacity. The forward end of hopper 25 communicates with a vertical hopper outlet 39 that leads downwardly into two pump chambers; only one pump chamber 69 is shown. A frame 42 mounted on machine base 21 extends over the top of hopper 25, above the hopper outlet 39, and a bracket 43 affixed to frame 42 supports three motors that drive three vertical feed screws. Only one motor 47 and one feed screw 53 are shown in FIG. 1.

A level sensing mechanism at the outlet end of hopper 25 comprises a sensing element 55 affixed to a shaft 56 that extends downwardly into the forward end of hopper 25. As food product moves forwardly in the hopper, it may accumulate to a level at which it engages sensor 55. When this occurs, shaft 56 is rotated and actuates a limit switch (not shown) to interrupt the drive for conveyor roller 36. This makes it possible to maintain the accumulation of food product at a safe level at the outlet end 39 of food hopper 25.

In machine 20, as noted above, the food pump system 26 comprises two reciprocating food pumps; only one pump 61 is illustrated. Food pump 61 includes a hydraulic cylinder 64. The piston 60 in cylinder 64 is connected to a piston rod 67 in turn connected to a large pump plunger 68. Plunger 68 is aligned with and extends into pump cavity 69, which is enclosed by a housing 71. The forward wall 74 of pump cavity 69 includes a slot 73 that communicates the pump manifold 27 as shown in the enlarged view of FIG. 2.

Figure 2:
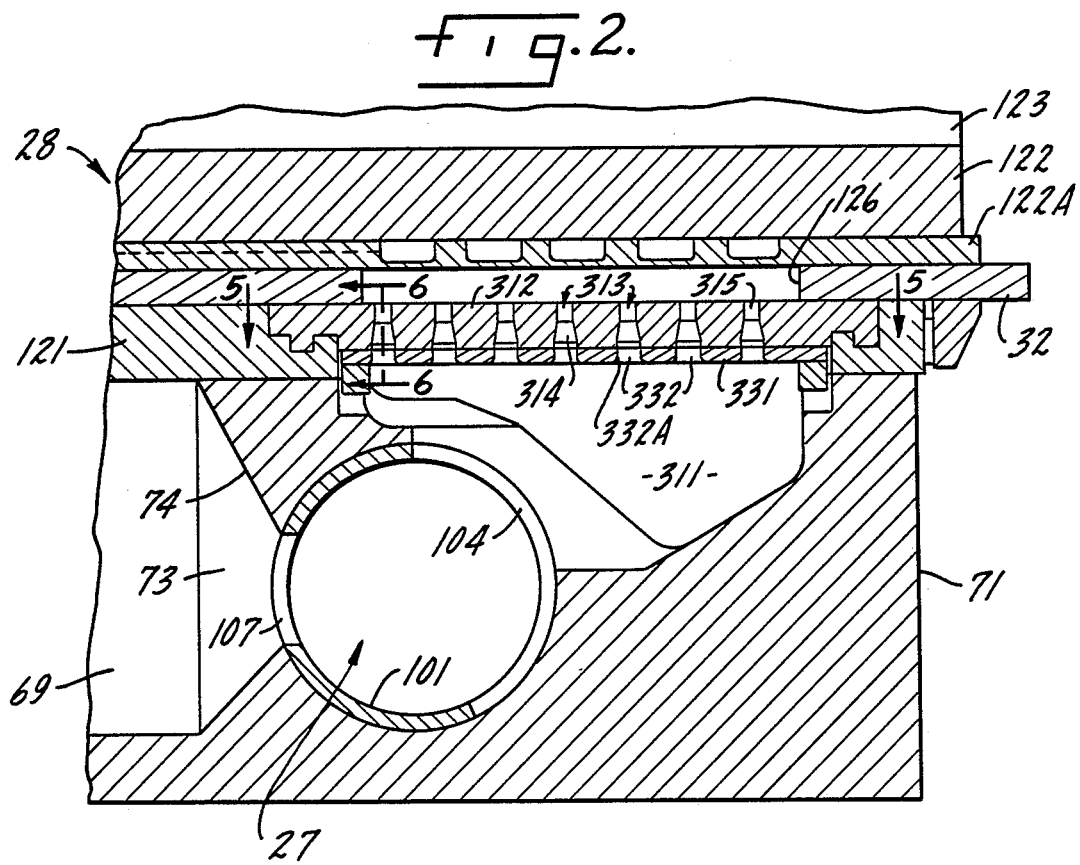
FIG. 2 is a sectional view, like FIG. 1, illustrating a modification of the machine of FIG. 1 as in Sandberg U.S. Pat. No. 4,372,008, with a stripper plate at a fill location.

Pump feed manifold 27 includes a valve cylinder 101 fitted into an opening in housing 71 immediately beyond wall 74. Valve cylinder 101, as shown in FIG. 2, includes two intake slots; only one intake slot 107 is illustrated. Slot 107 is alignable with the outlet slot 73 in pump cavity wall 74, and this is the position employed when pump 61 (FIG. 1) is in use. Rotation of cylinder 101 is effective to move slot 107 out of alignment with slot 73 when the other pump of machine 20 is in operation. Valve cylinder 101 also includes an elongated outlet slot aligned with a slot 111 (FIG. 1) in housing 71 that comprises a fill passage for the molding mechanism of station 28.

As seen in FIG. 1, the upper part of the pump housing 71 comprises a plate 121 that supports a mold plate 32. Mold plate 32 includes a plurality of individual mold cavities 126 distributed across the width of the mold plate; mold cavities 126 are alignable with the manifold outlet, fill passage 111, as shown in FIG. 1. A mold cover 122 is disposed immediately above mold plate 32, closing off the top of each of the mold cavities 126. Mold cover 122 may include a conventional breather plate 122A; see FIG. 2. Suitable spacers (not shown) are provided to maintain the spacing between cover 122 and support plate 121 essentially equal to thickness of mold plate 32. A housing 123 is positioned above cover plate 122, FIG. 1. Housing 123 encloses the operating mechanism (not shown) for knock-out cups 33.

In the operation of patty molding machine 20, a supply of ground meat or other moldable food product 38 is put into hopper 25, and is advanced toward hopper outlet 39 by conveyor 31. Whenever one of the food pump plungers, such as plunger 68 is retracted to expose a pump cavity (e.g., cavity 69), the vertical feed screws 53 aligned with that pump cavity are actuated to feed the food product into the pump cavity.

In FIG. 1 pumping system 26 is illustrated with mold plate 32 in its fill position and with pump 61 pumping the moldable food product through manifold 27. The second food pump of the machine, at this time, may be receiving a supply of the food product for a subsequent pumping operation. Pump 61, as shown, has just begun its pumping stroke, and has compressed the food product in pump cavity 69, forcing it under pressure into manifold 27. As operation of machine 20 continues, plunger 68 advances and food product flows into mold cavities 126, there is a relatively constant pressure on the food product in chamber 69, manifold 27, fill passage 111 and cavities 126.

Ultimately, when pump cavity 69 is nearly empty, valve cylinder 101 is rotated to connect its intake to the outlet of the second food pump (not shown) and to shut off its intake from pump chamber 69. Thereafter, the second food pump is maintained in operation. Plunger 68 of food pump 61 (FIG. 1) is then retracted, by means of cylinder 64 and piston 60, to allow for refilling of pump cavity 69 with food product 38. Subsequently, when the second food pump requires refilling, a corresponding changeover back to pump 61 occurs. In this manner, overlapping alternating operation of the two food pumps continues as long as molding machine 20 is in operation. Each time a pump changeover occurs, it is preceded by a rotation of valve cylinder 101 of manifold 27 to bring the new pump into operation before the refill cycle for the pump that has been in use is initiated.

In describing the operation of molding mechanism 28, and particularly mold plate 32, it is convenient to start with mold plate 32 in the fill position shown in FIG. 1. In each molding cycle, mold plate 32 remains in this fill position for a limited dwell interval. As the mold cavities cavities 126 move into the fill position, one of the two food pumps of machine 20 pumps food product through manifold 27 and fill passage 111, filling the mold cavities. To assure complete filling of the mold cavities, the food pump must apply a substantial pressure to the food product. In machine 20 the fill pressure on the food product may be well over one hundred pounds per square inch, subject to variation in accordance with the requirements of the food product being molded into patties, the sizes of the mold plate cavities 126, and other related factors. In other machines, different fill pressures may be required Following the fill dwell interval, mold plate 32 is moved outwardly, to the right from its fill position, as shown in FIG. 1, until it reaches a discharge position with its mold cavities 126 aligned with knockout cups 33. As mold plate 32 moves toward its discharge position, mold cavities 126 all move clear of fill passage 111 before any part of those cavities projects out of mold station 28, beyond support plate 121 and cover 122. Thus, the food pump in machine 20, as shown in FIG. 1, remains sealed off at all times. A second dwell interval occurs at the discharge position of mold plate 32, during which knockout cups 33 move downwardly through the mold cavities, discharging the molded food patties onto a takeoff conveyor (not shown).

Following discharge of the molded food patties, mold plate 32 is moved back toward its fill position so that mold cavities 126 can again be filled with food product. Again, mold cavities 126 are completely inside molding mechanism 28, sealed off, before they come into alignment with fill passage 111. In this manner, food patties are molded at a rapid pace by machine 20; the commercial version of machine 20 normally operates at a rate of ninety molding cycles per minute. Inasmuch as there may be as many as six or more mold cavities in mold plate 32, it is seen that the output rate for machine 20 may be in excess of five hundred food patties per minute.

FIG. 2 illustrates a modification of the patty molding machine 20 as provided in Sandberg U.S. Pat. No. 4,372,008. One change is in the size of the fill passage 311 of the molding mechanism, as compared with the fill slot 111 in the conventional construction. Fill passage 311 is greatly enlarged, immediately adjacent mold plate 32; fill passage 311 encompasses substantially the entire surface area of all of the mold cavities 126. A fill plate 312 is interposed in the outlet end of fill passage 311, immediately adjacent mold plate 32. A multiplicity of fill orifices 313 are distributed, preferably in staggered rows, throughout substantially the entire surface area of fill plate 312. Orifices 313, with inlets 314 and outlets 315, are distributed throughout the surface area of each of the mold cavities 126; see FIGS. 2, 3 and 5. Orifices 313 may be tapered in either direction relative to flow. Thus, in FIGS. 2 and 3 the orifices 313 taper inwardly from their inlets 314; in FIGS. 6 and 7 the taper is in the opposite direction. By way of example, each orifice may have an outlet diameter of about 0.25 inch (6.35 mm) with an inlet diameter of about 0.31 inch (7.87 mm), or that relation may be reversed. straight, untapered holes may also be used. In a typical construction, the angle of taper may be of the order of twenty degrees, but substantial variation is acceptable.

A stripper plate 331 is slidably mounted in fill passage 311 immediately adjacent the side of fill plate 312 opposite mold plate 32, as shown in FIG. 2. In fact, stripper plate 331 is disposed in surface-to-surface contact with orifice plate 312. Stripper plate 331 includes a multiplicity of fill openings 332 distributed throughout substantially its entire surface area and aligned one-for-one with fill orifices 313, so that each fill orifice 313 is an extension of one fill opening 332 when stripper plate 331 is in its fill location as shown in FIG. 2. Fill orifices 313 ad fill openings 332 may be aligned in parallel rows with equal center-to-center spaces between the orifices (and fill openings) in the direction of the orifice rows, discussed later in regard to FIG. 5. The edges 332A of fill openings 332 that face toward food passage 311 are rounded to minimize food product buildup; see FIG. 3.

Figure 3:
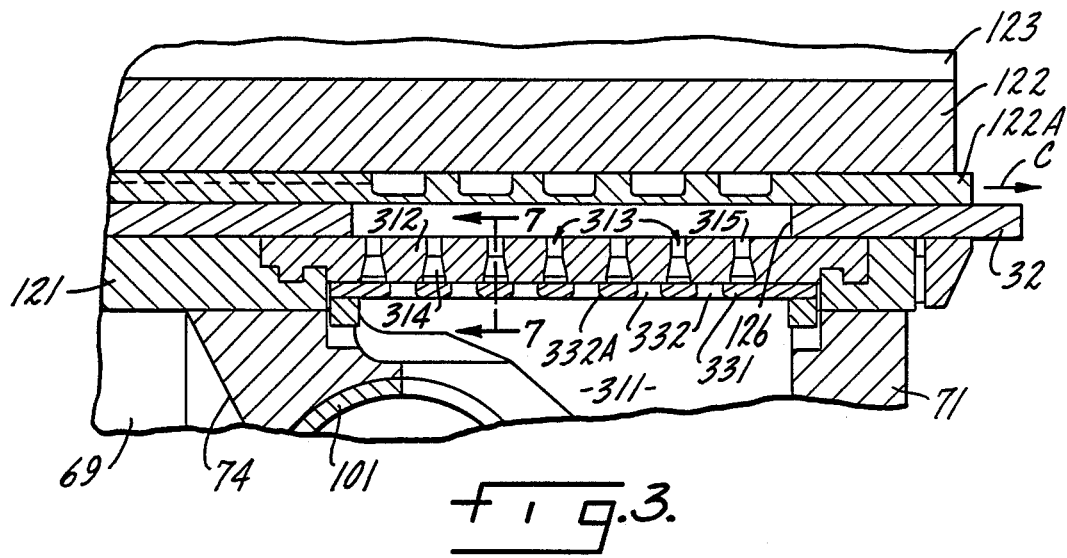
FIG. 3 is a sectional view like FIG. 2 but with the stripper plate at a seal off location.
Figure 5:
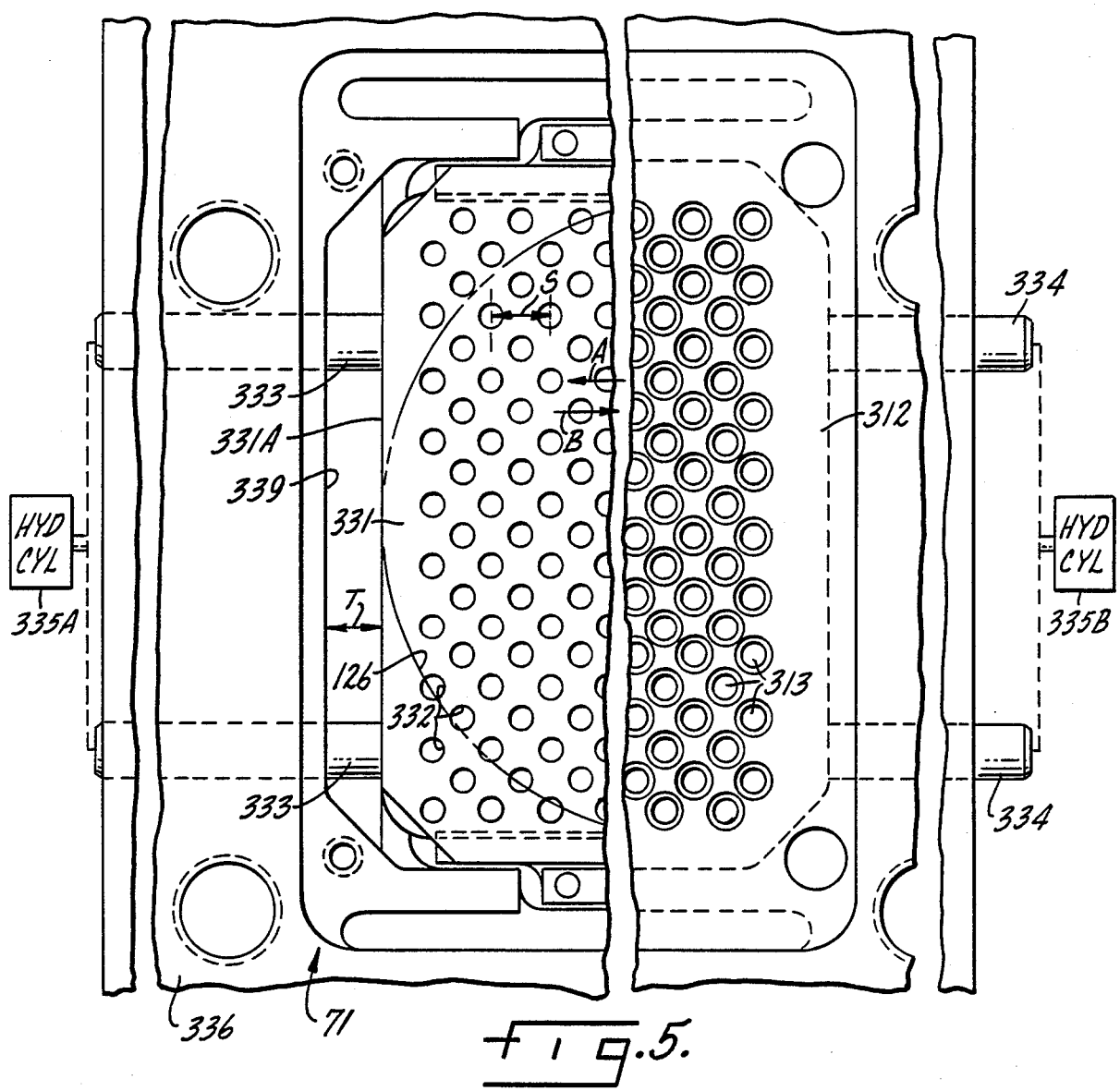
FIG. 5 is a plan view of the fill passage of a preferred embodiment of the present invention, taken approximately along line 5—5 in FIG. 2 but broken away to show a part of the stripper plate.

FIGS. 3 and 5 show the construction for fill plate 312 and stripper plate 331 as utilized in the present invention. Each end of stripper plate 331 has two push rods mounted thereon, the rods 333 at the left-hand side of the stripper plate and the rods 334 at the right-hand side of that plate. Rods 333 extend through the side wall 336 of housing 71 and are connected to a drive mechanism, preferably a hydraulic cylinder as indicated schematically at 335A. A similar construction is provided at the opposite end of plate 331, with a cylinder 335B. This affords a stripper plate drive means for sliding stripper plate 331 back and forth in the directions indicated by the arrows A and B, FIG. 5. Arrows A and B are transverse to the direction of mold plate travel, arrow C. In FIG. 5, stripper plate 331 is shown at the right-hand limit of its travel; at the opposite extreme, the left-hand edge 331A of the stripper plate engages a surface 339 that is a part of housing 71. The total travel of stripper plate 331 is a distance T, equal to the center-to-center orifice spacing S. FIG. 3 shows the stripper plate at a discharge or seal-off location, half-way between its travel limits.

The overall construction illustrated in FIGS. 2, 3 and 5 has been found to be highly advantageous in the formation of hamburger patties and other molded food patties in several respects. With this multiple-orifice full area fill passage arrangement, food product leaving the outlets 315 of orifices 313 expands within each mold cavity 126, filling the mold cavity completely. The food product flows only a short distance into the mold cavity, much less than in the conventional arrangement of FIG. 1, and expands from a series of locations immediately adjacent the orifice outlets instead of from one location. The result is an improvement in the texture of the molded food patties; the texture is more like that of a hand-molded food patty than is realized with the conventional construction described above in connection with FIG. 1. Furthermore, the food patties tend to shrink less and hold their shape more consistently when cooked.

Figure 4:
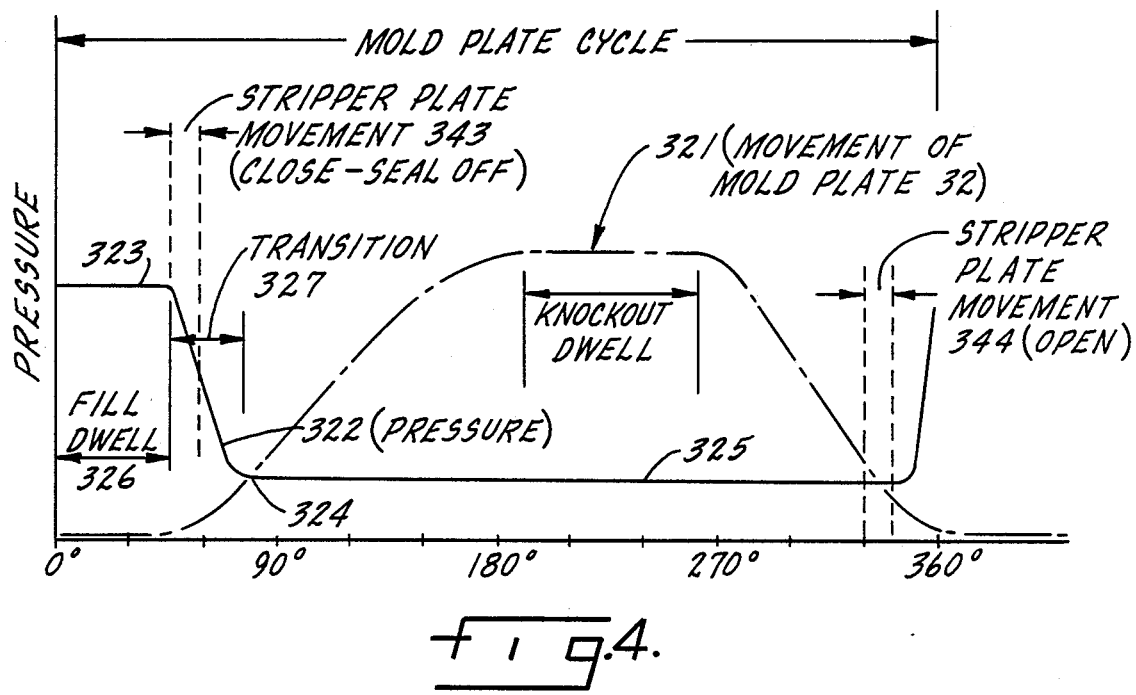
FIG. 4 is a chart of the mold plate and stripper plate cycles for the machine of FIG. 2.

As described in the aforementioned Sandberg et al U.S. Pat. No. 4,356,595 and Sandberg U.S. Pat. No. 4,372,008, the quality of the molded food patties can be improved by relieving the pressure on the food product in the pump cavity and in the fill passage throughout a substantial portion of the molding cycle. Specifically, quality of the molded food patties may be materially improved if the pressure is relieved substantially during the time interval in which the mold plate is moving away from its fill position but a part of the mold cavity remains in communication with the fill passage. The preferred pressure relationship is illustrated in FIG. 4 as a function of the mold plate cycle timing. In FIG. 4, the phantom line curve 321 shows the cyclic movement of mold plate 32. The solid line curve 322 illustrates the pressure applied to the food product in the fill passage of the machine.

As indicated in FIG. 4, a given maximum fill pressure 323 is applied to the food product in fill passage 311 during the fill dwell interval 326 to assure complete filling of the mold cavities. Immediately following the fill dwell interval 326, in a succeeding transition interval 327 in which mold plate 32 is moving away from its fill position but a part of each mold cavity 126 remains in communication with fill orifices 313, the pressure on the food product is reduced to an intermediate pressure 324 much less than the fill pressure 323. Typically, pressure 324 may be approximately twenty percent of fill pressure 323, though this value may vary depending upon the nature of the food product and the size and configuration of the mold cavities. Intermediate pressure 324 should be sufficient to preclude backflow of food product from the mold cavities into fill passage 311 during transition interval 327. This requirement can be met by maintaining intermediate pressure 324 in a range of about ten percent to fifty percent of the maximum fill pressure 323 in most instances. In the FORMAX 26 machine, using a fill pressure 323 of one hundred ten to one hundred fifty pounds per square inch, intermediate pressure 324 may be in a range of about ten to seventy-five pounds per square inch; in other machines, of course, other values are likely to be required.

As also indicated in FIG. 4, the pressure on the food product is preferably retained at or below the intermediate pressure 324 during the remainder of the cycle. That is, during extended interval 325 until near the end of the mold cycle, pressure on the food product remains at or below intermediate pressure 324. The pressure relief interval 325 may be maintained through a major portion of the mold plate cycle.

Figure 6:
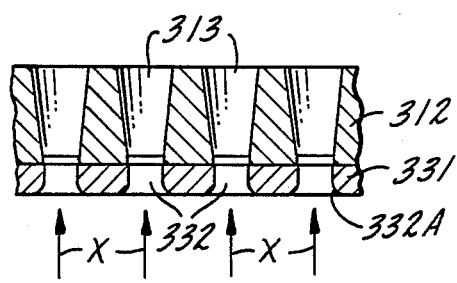
FIGS. 6 and 7 are detail sectional views, taken approximately as indicated by lines 6—6 and 7—7 in FIGS. 2 and 3, respectively.
Figure 7:
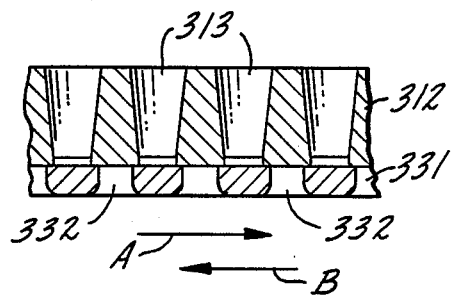

The operation of stripper plate 331 can best be understood by reference to FIGS. 6 and 7. FIG. 6 shows the alignment of the stripper plate with fill plate 312 during the fill dwell interval 326 (FIG. 4). It is the same alignment shown in FIGS. 2 and 5. This position is maintained throughout the fill dwell interval, with food product being pumped under pressure through fill openings 332 and orifices 313 (arrows X) and on into the mold cavities. During this interval relatively long fibers present in the food product may catch on the edges 332A of the stripper plate fill openings 332.

After the end of the fill dwell, with the mold cavities filled and the mold plate beginning its movement toward its discharge position (arrow C in FIG. 5), stripper plate 331 is shifted through a distance equal to one-half the distance T (FIG. 5) to its discharge or seal-off location. FIG. 7 shows the stripper plate at its discharge location; the direction of movement is in the direction of the arrow A, FIGS. 5 and 7. When that movement is later resumed and completed, again in the direction of arrow A for a distance T/2, stripper plate 331 is again positioned in a fill location with its fill openings 332 aligned one-for-one with the orifices 313, the same alignment shown in FIG. 6. Movement of the stripper plate, however, has severed any long food fibers hung up on the stripper plate and has re-positioned the fibers in alignment with fill openings 332. When movement of the ground meat or other food product commences in the fill dwell interval of the next mold plate cycle, the re-positioned fibers pass through the fill openings 332 and orifices 313 into the mold cavities. During this fill dwell, additional fibers may accumulate on the edges of the fill openings in stripper plate 331. Those fibers are re-positioned, and severed if long enough, when the stripper plate slides back to its discharge location and then to its original fill position, in the direction of arrow B (FIGS. 5 and 7) later in the next mold plate cycle. Thus, when the return movement of stripper plate 331 is completed, the fibers are again aligned with the orifices and will be impelled into the mold cavities in the next fill dwell interval.

Maintenance of some fill pressure, forcing food product against the side of stripper plate 331 facing fill passage 311 is desirable during the sliding movements of the stripper plate because it prevents food product from working its way between the stripper and orifice plates. A preferred timing for the movement of stripper plate 331 is indicated by stripper plate movement intervals 343 and 344 in FIG. 4. The first stripper plate movement of T/2 to the discharge location shown in FIG. 3 occurs in interval 343, and is subject to some variation. There should be no appreciable overlap of interval 343 with the fill dwell interval 326, but movement of stripper plate 331 to its discharge or seal-off location should be completed before any portion of any of the mold cavities 126 is exposed beyond cover 122 and support plate 121. Moreover, the stripper plate should remain in its discharge (seal-off) location until all mold cavities are displaced beyond fill orifices 313.

Thus, in each mold plate cycle stripper plate 331 first slides through the distance T/2 (T=S, FIG. 5), during interval 343, to start repositioning and severing fibers accumulating on the edges of the fill openings 332 and to seal off mold cavities 126 so that no food product can be pumped through the food cavities and out of mold station 28 while mold plate 32 is moving to its discharge position. While the mold plate is in its discharge dwell, the stripper preferably remains in its discharge/seal-off position so that when the mold plate moves back in to its fill position there is no interval when there is a complete open path from fill passage through the mold cavities to the outside of the molding station. Thus, continuing movement to a fill location for stripper plate 331 preferably occurs during an interval 344 (FIG. 4) when mold cavities 126 are already fully enclosed within molding station 28. Because the mold cavities are empty, however, interval 344 is less critical than interval 343; there may not be enough time for any leakage of food product, and the stripper plate may be moved to a fill location in advance of return movement of the mold plate. In either case, buildup of food product at the inlet ends of orifices 313 is effectively precluded, despite the presence of substantial fiber content; the patty molding operation can be maintained at full speed.

In the foregoing description, stripper plate 331 has two fill locations, with just one discharge/seal-off location half way between. Alternatively, the molding machine may be set up for just one fill location, in which case the stripper plate moves a distance of approximately T/2 in one direction (e.g. arrow A) to its seal-off location, then back in the opposite direction (arrow B) later in the same mold plate cycle. The full displacement arrangement as described, with two fill locations, is somewhat better as regards severance and repositioning of long fibers, but the alternatives are equal with respect to effective seal-off of the food pump system.

I claim:

1. In a food patty molding machine comprising:
   a mold plate having at least one mold cavity therein;
   mold plate drive means for driving the mold plate along a given path, in a repetitive cycle, between a fill position and a discharge position;
   food pump means for pumping a moldable food product;
   a fill passage connecting the food pump to the mold cavity when the mold plate is in its fill position;
   a fill plate, interposed in the fill passage immediately adjacent the mold plate, having a multiplicity of fill orifices distributed in a predetermined pattern throughout an area aligned with the mold cavity when the mold plate is in its fill position;
   a stripper plate interposed in the fill passage immediately adjacent the side of the fill plate opposite the mold plate, and movable along a path transverse to the mold plate path between a fill location and a discharge location, the stripper plate having a multiplicity of fill openings aligned one-for-one with the fill orifices as extensions thereof when the stripper plate is in its fill location;
   and stripper plate drive means, synchronized with the mold plate drive means, for moving the stripper plate between its fill location and its discharge location;
   the improvement in which:
   the spacings between fill openings in the stripper plate, in the direction of the stripper plate path, are such that movement of the stripper plate to its discharge location seals off the fill openings;
   the stripper plate drive means moves the stripper plate to its discharge location, in each mold cycle, before the mold cavity moves appreciably away from its fill position toward its discharge position; and
   the stripper plate drive means maintains the stripper plate in its discharge location while the mold plate moves toward its discharge position at least until the mold cavity is displaced beyond the fill orifices.

2. A food patty molding machine according to claim 1 in which the fill orifices are distributed in rows regularly spaced in the direction of mold plate movement by a spacing S and in which the distance the stripper plate moves, from its fill location to its discharge location, is S/2.

3. A food patty molding machine according to claim 2 in which the stripper plate has two fill locations spaced by a distance T such that T=S, and in which, in each mold plate cycle, the stripper plate moves from one fill location by a distance S/2, in a given direction along its path, to its discharge location, and subsequently moves a further distance S/2 in the same direction to its other fill location.

4. A food patty molding machine according to claim 3 in which, in each mold plate cycle, movement of the stripper plate from its one fill location to its discharge location occurs in a first interval that starts approximately when movement of the mold plate to its discharge position begins, and movement of the stripper plate from its discharge position to its other fill position starts when the mold plate approaches its fill position.

* * * * *